Oct. 31, 1939.  P. F. BERRY  2,178,160
FASTENING DEVICE
Filed Sept. 16, 1937
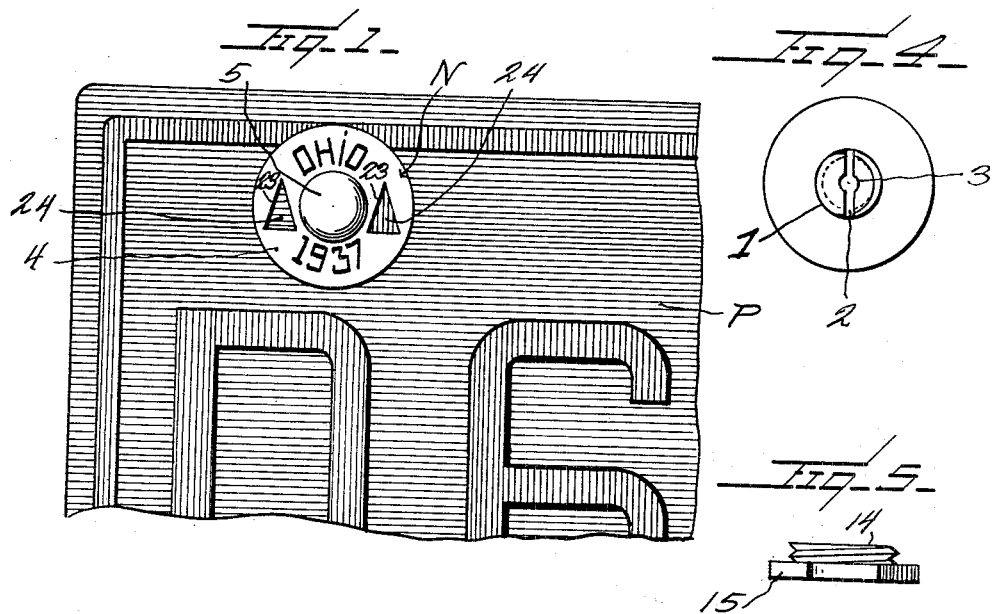
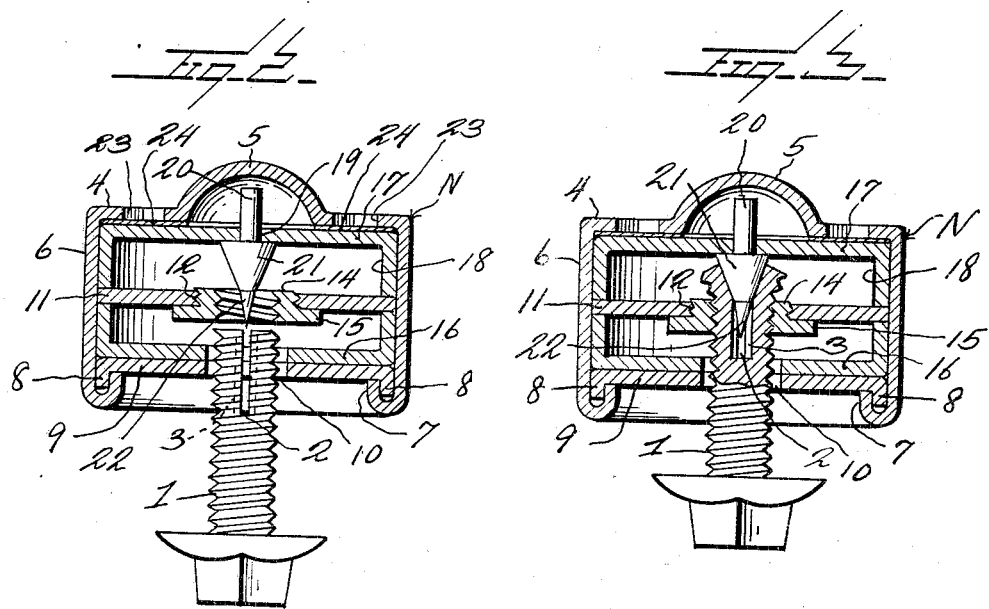
Inventor
P. F. Berry
By Watson E. Coleman
Attorney Patented Oct. 31, 1939

2,178,160

UNITED STATES PATENT OFFICE 2,178,160

FASTENING DEVICE

Paul F. Berry, Columbus, Ohio

Application September 16, 1937, Serial No. 164,258

9 Claims. (Cl. 151—23)

This invention relates to a fastening device, and it is an object of the invention to provide a device including a bolt and nut therefor and wherein said bolt and nut comprise means permitting application of the device to the work but necessitating destruction of the work before the fastening device can be removed.

It is also an object of the invention to provide a fastening device of this kind including a bolt and nut therefor having coacting means to readily permit the desired application of the nut upon the work but wherein complete separation of the nut and bolt is prevented other than by destruction.

A further object of the invention is to provide a fastening device having means whereby the device can be definitely identified with the work, such as a license plate for motor vehicles, with which it may be employed.

The invention consists in the details of construction and in the combination and arrangement of the several parts of my improved fastening device whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a view in elevation illustrating a fastening device constructed in accordance with an embodiment of my invention in applied position with respect to a license plate for motor vehicles, the plate being shown in fragment;

Figure 2 is a view partly in section and partly in elevation of the fastening device as herein disclosed with the bolt and nut in an initial assembly;

Figure 3 is a view similar to Figure 2 with the bolt and nut in work engaging or clamping relation;

Figure 4 is a view in top plan of the bolt as illustrated in Figure 2;

Figure 5 is a view in side elevation of the bushing as herein employed unapplied.

As disclosed in the accompanying drawing, 1 denotes the shank of a bolt which is provided in its outer or free end portion with a transversely disposed kerf 2, the central portion of the resultant bifurcation being transversely enlarged, as at 3.

The nut N comprises an outer shell of a general cup-like formation having a body plate or portion 4, the central part of which is formed to provide an outstanding dome 5. The margin of the body plate or portion 4 is defined by a surrounding flange 6 of desired length and which has its outer portion returned, as at 7, for clinching engagement with the marginal flange 8 carried by the plate 9 which extends across the initially open face of the shell. The plate 9 constitutes an end wall of the nut N and the central portion of this plate 9 is provided with an opening 10 through which the shank 1 is readily insertable.

Held within the nut N at a desired point inwardly of the plate 9 is a second plate or nut 11 having a central threaded opening 12 in axial alignment with the opening 10, said opening 12 being however of a diameter in excess of the diameter of the opening 10. Threading into the opening 12 from the side of the plate or nut 11 opposed to the plate 9 is a bushing 14, the lower marginal portion of which is defined by a laterally disposed annular flange 15 which, when the bushing 14 is applied within the opening 12, contacts with the nut or plate 11. It is to be particularly noted that the major diameter of the flange 15 is materially in excess of the opening 10 of the plate 9 so that in the assembled nut the bushing 14 is incapable of being passed out through the opening 10.

Interposed between the applied plate or nut 11 and the plate 9 is a cup-like spacing washer 16.

Also arranged within the nut N and having contact with the inner face of the body plate or portion 4 is the plate 17 which is defined by a marginal flange 18 disposed toward and contacting with the applied nut or plate 11 whereby this plate 17 is maintained in desired position. This plate 17 is provided with an opening 19 positioned axially of the openings 10 and 12 and through which is disposed an elongated stem 20 carried by a conical head 21. This head 21 bridges the space between the nut or plate 11 and the plate 17 with its apex outwardly disposed, and it is to be noted that the apex portion of the head 21 is elongated, as at 22, with its tip terminating at a point preferably slightly beyond the lower or inner end of the bore of the bushing 14 so that it will not be possible to thread within the bore of the bushing 14 a solid shank but only a specially constructed shank as is herein described and illustrated in the accompanying drawing.

It is further to be stated that the base or largest diameter of the head 21 is in excess of the diameter of the bore of the bushing 14 but less than the diameter of the opening 12 in the nut or plate 11. The stem 20 is also of a length to have its outer or free end portion retained within the opening 19 of the plate 17 in the event, for any reason, the head 21 should drop down into contact with the applied bushing 14.

As the shank 1 is inserted into the nut through the opening 10 of the plate 9, the apex portion 22 of the head 21 will enter the transversely enlarged portion 3 of the kerf or bifurcation 2 and as the shank 1 is threaded into and through the bore of the bushing 14 the head 21 will operate to expand the outer or free end portion of the shank 1 and cause the same to have effective binding engagement with the bushing 14. This engagement is made because when effort is made to separate the nut N from the shank 1 the retrograde rotation of either the shank 1 or the nut N will cause the bushing 14 to thread out of the opening 12. However, as the bushing 14, on account of the flange 15, cannot pass out through the opening 10 in the plate 9 it will be readily understood that when the bushing 14 is free of the nut or plate 11 it will be retained between the nut or plate 11 and the plate 9 and thus preventing complete separation of the nut N and the shank 1 except as a result of destruction.

Interposed between the body plate or portion 4 and the applied plate 17 are the laminations 24 of any suitable reflecting material and the lamination 24 associated with one opening 23 is of one color and the second lamination 24 is of a second color, said colors of course corresponding to the two colors comprised in the license plate P. By the provision of the openings 23 and the laminations 24 speedy identification of the relation of the fastening device to the plate P is given and particularly when light is thrown upon the plate P and the fastening device.

From the foregoing description it is thought to be obvious that a fastening device constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A fastening device comprising, in combination, a threaded shank having its outer end portion bifurcated, a nut into which the shank is insertable, said nut comprising a shell, a pair of spaced plates carried by and intersecting the shell, the outer plate having an opening for the passage of the shank, the inner plate having an opening of a diameter larger than the opening of the outer plate, and a bushing having external and internal threads in reversed relation, said bushing threading into the opening of the inner plate, the shank threading into the applied bushing, the end portion of the bushing opposed to the first plate being of a major diameter greater than the diameter of the opening in the outer plate, and means within the nut engaging within the bifurcation of the shank as said shank threads through the bushing to expand said shank to clinch the same to the bushing.

2. A fastening device comprising, in combination, a threaded shank having its outer end portion bifurcated, a nut into which the shank is insertable, said nut comprising a shell, a pair of spaced plates carried by and intersecting the shell, the outer plate having an opening for the passage of the shank, the inner plate having an opening of a diameter larger than the opening of the outer plate, a bushing having external and internal threads in reversed relation, said bushing threading into the opening of the inner plate, the shank threading into the applied bushing, the end portion of the bushing opposed to the first plate being of a major diameter greater than the diameter of the opening in the outer plate, and means within the nut engaging within the bifurcation of the shank as said shank threads through the bushing to expand said shank to clinch the same to the bushing, said bushing being of a length less than the distance between the outer and inner plates.

3. A fastening device comprising, in combination, a threaded shank having its outer end portion bifurcated, a nut into which the shank is insertable, said nut comprising a shell, a pair of spaced plates carried by and intersecting the shell, the outer plate having an opening for the passage of the shank, the inner plate having an opening of a diameter larger than the opening of the outer plate, a bushing having external and internal threads in reversed relation, said bushing threading into the opening of the inner plate, the shank threading into the applied bushing, the end portion of the bushing opposed to the first plate being of a major diameter greater than the diameter of the opening in the outer plate, and means within the nut engaging within the bifurcation of the shank as said shank threads through the bushing to expand said shank to clinch the same to the bushing, the means for expanding the shank comprising a tapered head mounted within the nut.

4. A fastening device comprising, in combination, a threaded shank having its outer end portion bifurcated, a nut into which the shank is insertable, said nut comprising a shell, a pair of spaced plates carried by and intersecting the shell, the outer plate having an opening for the passage of the shank, the inner plate having an opening of a diameter larger than the opening of the outer plate, a bushing having external and internal threads in reversed relation, said bushing threading into the opening of the inner plate, the shank threading into the applied bushing, the end portion of the bushing opposed to the first plate being of a major diameter greater than the diameter of the opening in the outer plate, and means within the nut engaging within the bifurcation of the shank as said shank threads through the bushing to expand said shank to clinch the same to the bushing, the means for expanding the shank comprising a tapered head mounted within the nut, the outer or apex portion of the head being elongated.

5. A fastening device comprising, in combination, a threaded shank having its outer end portion bifurcated, a nut into which the shank is insertable, said nut comprising a shell, a pair of spaced plates carried by and intersecting the shell, the outer plate having an opening for the passage of the shank, the inner plate having an opening of a diameter larger than the opening of the outer plate, a bushing having external and internal threads in reversed relation, said bushing threading into the opening of the inner plate, the shank threading into the applied bushing, the end portion of the bushing opposed to the first plate being of a major diameter greater than the diameter of the opening in the outer plate, and means within the nut engaging within the bifurcation of the shank as said shank threads through the bushing to expand said shank to clinch the same to the bushing, the means for expanding the shank comprising a tapered head mounted within the nut, said head having a major diameter in excess of the diameter of the bore of the bushing but less than the diameter of the opening in the inner plate.

6. A fastening device comprising, in combination, a threaded shank having its outer end portion bifurcated, a nut into which the shank is insertable, said nut comprising a shell, a pair of spaced plates carried by and intersecting the shell, the outer plate having an opening for the passage of the shank, the inner plate having an opening of a diameter larger than the opening of the outer plate, a bushing having external and internal threads in reversed relation, said bushing threading into the opening of the inner plate, the shank threading into the applied bushing, the end portion of the bushing opposed to the first plate being of a major diameter greater than the diameter of the opening in the outer plate, and means within the nut engaging within the bifurcation of the shank as said shank threads through the bushing to expand said shank to clinch the same to the bushing, the means for expanding the shank comprising a tapered head mounted within the nut, said head being of a length to extend within the bore of the bushing.

7. A fastening device comprising a threaded shank, a hollow member, an end wall for said member having an opening, a plate within the hollow member having a threaded opening aligning with the opening in the end wall of the hollow member, said threaded opening being of a diameter greater than the other opening, a bushing having an external thread to allow said bushing to thread into the opening of the plate, said bushing also having an internal thread reversely disposed with respect to the external thread, the shank being freely insertable through the opening in the end wall and threading into said bushing, means within the hollow member for binding the bushing and shank as the shank threads through the bushing, the end portion of the bushing opposed to the end wall of the hollow member being of a diameter in excess of the diameter of the opening of the plate into which the bushing threads.

8. A fastening device comprising a threaded shank, a hollow member, an end wall for said member having an opening, a plate within the hollow member having a threaded opening aligning with the opening in the end wall of the hollow member, said threaded opening being of a diameter greater than the other opening, a bushing having an external thread to allow said bushing to thread into the opening of the plate, said bushing also having an internal thread reversely disposed with respect to the external thread, the shank being freely insertable through the opening in the end wall and threading into said bushing, means within the hollow member for binding the bushing and shank as the shank threads through the bushing, the end portion of the bushing opposed to the end wall of the hollow member being of a diameter in excess of the diameter of the opening of the plate into which the bushing threads, the plate within the hollow member being spaced from the end wall of the hollow member a distance in excess of the length of the bushing.

9. A fastening device comprising, in combination, a threaded shank, a nut into which the shank is insertable, said nut comprising a shell, a pair of spaced plates carried by and intersecting the shell, the outer plate having an opening for the passage of the shank, the inner plate having an opening of a diameter larger than the opening of the outer plate, and a bushing having external and internal threads in reversed relation, said bushing threading into the opening of the inner plate, the shank threading into the applied bushing, the end portion of the bushing opposed to the first plate being of a major diameter greater than the diameter of the opening in the outer plate, and means within the nut engaging the shank as said shank threads through the bushing to expand said shank to clinch the same to the bushing.

PAUL F. BERRY.